(12) United States Patent
Nichols

(10) Patent No.: US 7,477,185 B2
(45) Date of Patent: *Jan. 13, 2009

(54) METHOD OF TRACKING AT LEAST ONE MOBILE UNIT COMPRISING INTEGRATED RADIO/PSEUDOLITE TRANSCEIVER AND LASER DETECTOR BY UTILIZING STATIONARY SELF-POSITIONING RADIO TRANSCEIVER AND STATIONARY LASER TRANSMITTER

(75) Inventor: Mark E. Nichols, Christchurch (NZ)

(73) Assignee: Trimble Navigation Ltd, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,846

(22) Filed: Oct. 2, 2006

(65) Prior Publication Data
US 2007/0159386 A1  Jul. 12, 2007

Related U.S. Application Data

(63) Continuation of application No. 11/059,167, filed on Feb. 15, 2005, now Pat. No. 7,116,269.

(51) Int. Cl.
G01S 5/10 (2006.01)
(52) U.S. Cl. .................. 342/357.08; 342/357.03; 342/357.09
(58) Field of Classification Search ...............................
342/357.01–357.03, 357.06, 357.08, 357.09; 701/213, 215; 356/141.1, 141.3, 141.4
See application file for complete search history.

(56) References Cited

U.S. PATENT DOCUMENTS 6,433,866 B1    8/2002  Nichols
7,116,269 B2 *  10/2006 Nichols ................. 342/357.08

* cited by examiner

Primary Examiner—Dao L Phan
(74) Attorney, Agent, or Firm—Boris G. Tankhilevich

(57) ABSTRACT

A method of tracking at least one mobile unit utilizing a radio and light based 3-D positioning system comprising a stationary self-positioning radio (pseudolite) transceiver, a stationary laser transmitter positioned in a location with known coordinates, a wireless link, and a display. The method comprises: (A) determining position coordinates of the stationary self-positioning radio (pseudolite) transceiver; (B) broadcasting at least one internal radio signal by using the self-positioning radio (pseudolite) transceiver via the wireless link; (C) generating at least one laser beam by using the stationary laser transmitter; (D) broadcasting at least one laser beam; (E) receiving a plurality of external radio signals, receiving at least one internal radio signal by using the wireless link, and detecting at least one laser beam by using integrated radio (pseudolite) transceiver/laser detector; (F) determining 3-D position coordinates of at least one mobile unit comprising the integrated radio (pseudolite) transceiver/laser detector; (G) broadcasting 3-D position coordinates of at least one mobile unit via the wireless link; and (H) receiving and displaying the position coordinates of at least one mobile unit.

15 Claims, 2 Drawing Sheets

METHOD OF TRACKING AT LEAST ONE MOBILE UNIT COMPRISING INTEGRATED RADIO/PSEUDOLITE TRANSCEIVER AND LASER DETECTOR BY UTILIZING STATIONARY SELF-POSITIONING RADIO TRANSCEIVER AND STATIONARY LASER TRANSMITTER

This is the continuation application for the U.S. patent application Ser. No. 11/059,167, filed on Feb. 15, 2005 now U.S. Pat. No. 7,116,269, and entitled "RADIO AND LIGHT BASED THREE DIMENSIONAL POSITIONING SYSTEM".

BACKGROUND OF THE INVENTION

1. Field of the Invention

The current invention relates to machine control systems, and, more specifically, to a combination of a stationary laser system and a stationary radio positioning system configured to complement each other in order to optimize the machine control capabilities of prior art systems.

2. Discussion of the Prior Art

In recent times there have been advances in the area of radio ranging or pseudolite systems. A pseudolite is a ground based radio transmitter that works in the GPS band and transmits signals similar to the GPS system. Because of limitations on using the L band for non-military purposes a new form of "pseudolite" is being developed that uses alternative frequencies such as the 2.4 GHz license free band.

In recent times there have been also advances in rotating laser systems including plane lasers and fan laser systems. Plane lasers provide a reference plane of light. Fan lasers provide one or more planes of light that are rotated about an axis, from which a difference in elevation can be derived. The common technique for deriving the difference in elevation is by determining the difference in time between detection of two or more fan beams. These systems, such as the Trimble LaserStation and Topcon LaserZone systems provide accurate differences in elevation.

However, an inherent weakness in a radio positioning-based (or a pseudolite-based) system is the vertical accuracy, wherein an inherent weakness in a laser system is either its inability to provide horizontal position, or limitations on the range over which it can provide horizontal position.

SUMMARY OF THE INVENTION

The present invention addresses these problems by providing a 3-D positioning system comprising a radio positioning system and a laser positioning system that provides a better vertical accuracy than a satellite-based system can provide, and that is capable of tracking at least one mobile unit.

One aspect of the present invention is directed to a method of tracking at least one mobile unit utilizing a radio and light based 3-D positioning system, wherein the radio and light based 3-D positioning system comprises a stationary self-positioning radio (pseudolite) transceiver, a stationary laser transmitter positioned in a location with known coordinates, at least one mobile integrated radio (pseudolite) transceiver/laser detector (R/P_T&L_D), and a wireless link.

In one embodiment, the method of the present invention comprises: (A) determining position coordinates of the stationary self-positioning radio (pseudolite) transceiver based on a first plurality of external radio signals by using the stationary self-positioning radio (pseudolite) transceiver; (B) broadcasting at least one internal radio signal by using the self-positioning radio (pseudolite) transceiver via the wireless link; (C) generating at least one laser beam by using the stationary laser transmitter; (D) broadcasting at least one laser beam generated by the stationary laser transmitter; (E) receiving a second plurality of external radio signals, receiving at least one internal radio signal by via the wireless link, and detecting at least one laser beam by using the integrated radio (pseudolite) transceiver/laser detector (R/P_T&L_D); (F) determining 3-D position coordinates of the mobile unit comprising the integrated radio (pseudolite) transceiver/laser detector (R/P_T&L_D) based on a set of data selected from the group consisting of: {the second plurality of received external radio signals; at least one received internal radio signal; and at least one detected laser beam}; and (G) broadcasting the 3-D position coordinates of at least one mobile unit by using the integrated radio (pseudolite) transceiver/laser detector (R/P_T&L_D) via the wireless link.

In one embodiment of the present invention, the step (A) further comprises (A1) receiving the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the step (C) further comprises generating a reference laser beam providing a high accuracy vertical coordinate by using a plane laser transmitter. In another embodiment of the present invention, the step (C) further comprises (C2) generating at least one rotating fan-shaped laser beam by using a fan laser transmitter.

In one embodiment of the present invention, the step (E) further comprises (E1) receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter} by the mobile unit comprising the integrated radio (pseudolite) transceiver/laser detector (R/P_T&L_D).

In one embodiment of the present invention, the step (F) further comprises: (F1) determining 3-D position coordinates of the mobile unit comprising the integrated radio (pseudolite) transceiver/laser detector (R/P_T&L_D) at the first level of accuracy based on the second plurality of received external radio signals; and (F2) determining an elevation coordinate of the mobile unit comprising the integrated radio (pseudolite) transceiver/laser detector (R/P_T&L_D) at the second level of accuracy based on at least one detected laser beam; wherein a set of measurements determined at the second level of accuracy is more accurate than the set of measurements determined at the first level of accuracy.

In one embodiment of the present invention, the step (F) further comprises: (F3) determining 3-D position coordinates of the mobile unit comprising the integrated radio (pseudolite) transceiver/laser detector (R/P_T&L_D) at the first level of accuracy based on the second plurality of received external radio signals and based on at least one received internal radio signal; and (F4) determining an elevation coordinate of the mobile unit comprising the integrated radio (pseudolite) transceiver/laser detector (R/P_T&L_D) at the second level of accuracy based on at least one detected laser beam; wherein the set of measurements determined at the second level of accuracy is more accurate than the set of measurements determined at the first level of accuracy.

In one embodiment of the present invention, the step (F) further comprises: (F5) assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

In one embodiment, the method of the present invention further comprises: (H) receiving the 3-D position coordinates of at least one mobile unit by the self-positioning radio (pseudolite) transceiver.

In one embodiment of the present invention, the step (H) further comprises: (H1) displaying location of at least one mobile unit on the display block.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
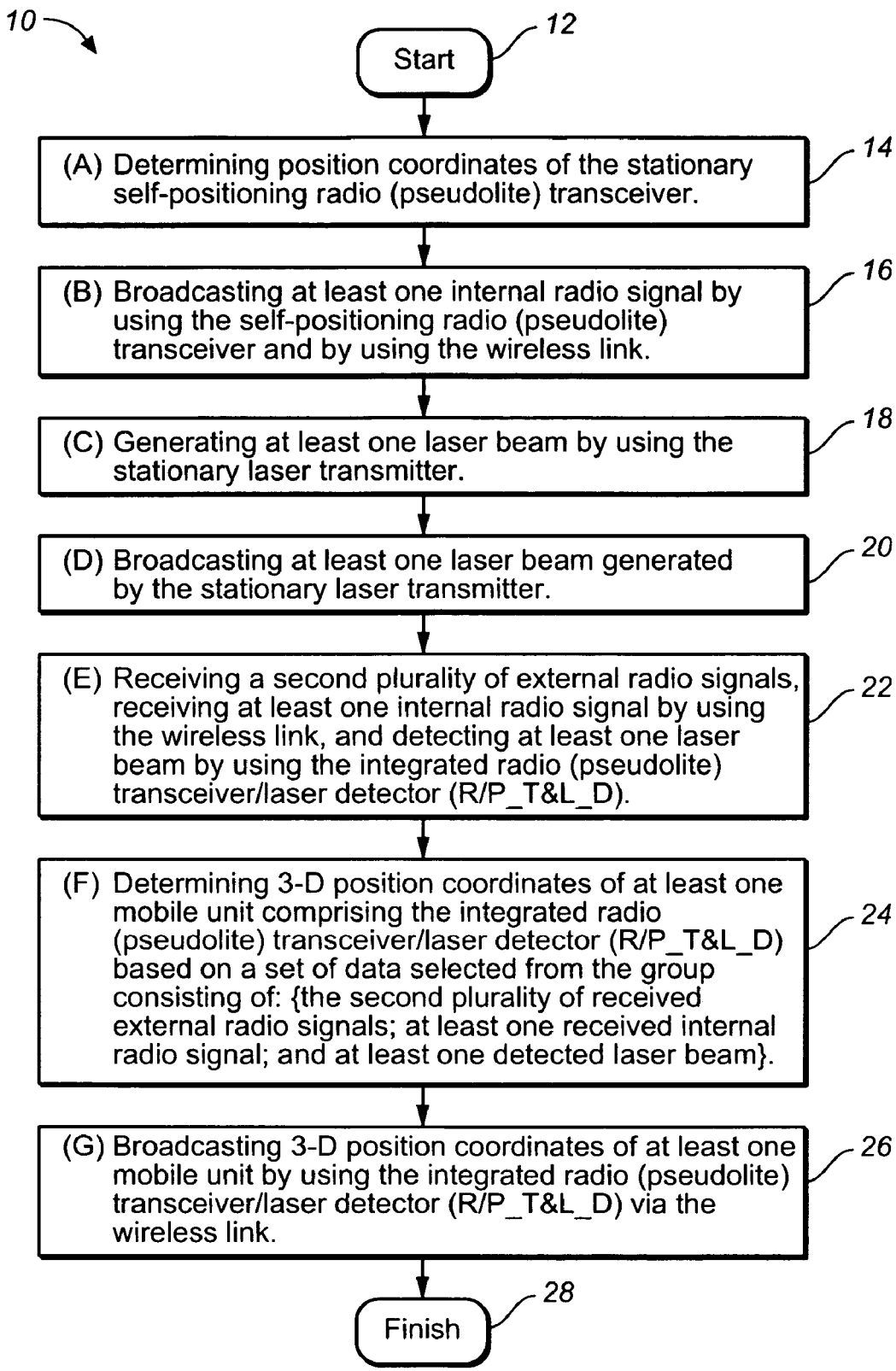
FIG. 1 is a flow chart of the method of the present invention for tracking at least one mobile unit.

In one embodiment, the method of the present invention for tracking at least one mobile unit utilizing a radio and light based 3-D positioning system is shown in the flow chart 10 of FIG. 1.

In one embodiment, the method of the present invention comprises: (A) determining position coordinates of the stationary self-positioning radio (pseudolite) transceiver based on a first plurality of external radio signals by using the stationary self-positioning radio (pseudolite) transceiver—step 14; (B) broadcasting at least one internal radio signal by using the self-positioning radio (pseudolite) transceiver via the wireless link—step 16; (C) generating at least one laser beam by using the stationary laser transmitter—step 18; (D) broadcasting at least one laser beam—step 20; (E) receiving a second plurality of external radio signals, receiving at least one internal radio signal via the wireless link, and detecting at least one laser beam by using the integrated radio (pseudolite) transceiver/laser detector (R/P_T&L_D)—step 22; (F) determining 3-D position coordinates of at least one mobile unit comprising the integrated radio (pseudolite) transceiver/laser detector (R/P_T&L_D) based on a set of data selected from the group consisting of: {the second plurality of received external radio signals; at least one received internal radio signal; and at least one detected laser beam}—step 24; and (G) broadcasting the 3-D position coordinates of at least one mobile unit by using the integrated radio (pseudolite) transceiver/laser detector (R/P_T&L_D) via the wireless link—step 26.

Figure 2:
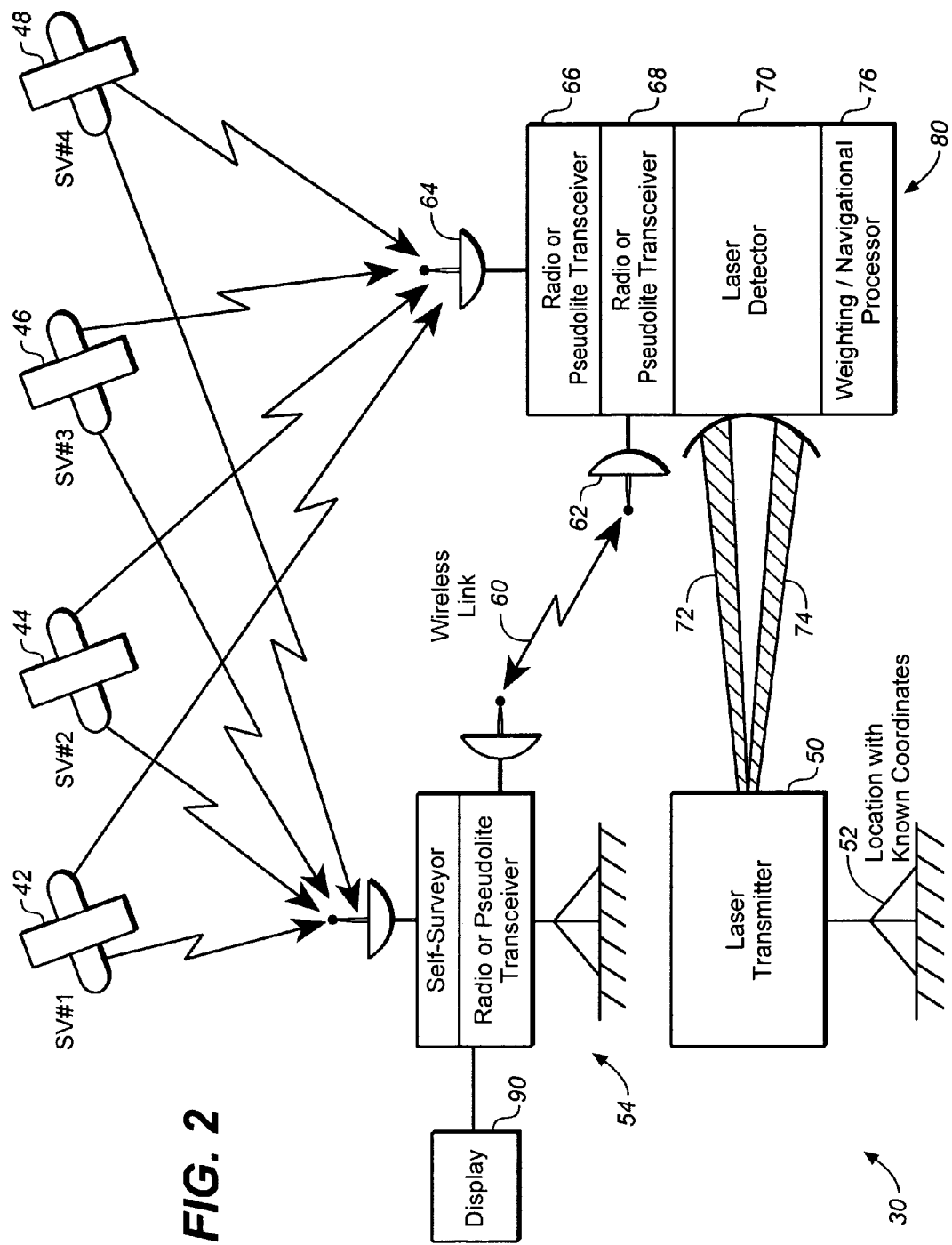
FIG. 2 depicts a radio and light based 3-D positioning system comprising a stationary self-positioning radio (pseudolite) transceiver, a stationary laser transmitter positioned in a location with known coordinates, at least one mobile integrated radio (pseudolite) transceiver/laser detector (R/P_T&L_D), a wireless link, and a display.

In one embodiment of the present invention, the method of the present is performed by using the radio and light based 3-D positioning system 30 comprising a stationary self-positioning radio (pseudolite) transceiver 54, a stationary laser transmitter 50 positioned in a location with known coordinates 52, at least one mobile integrated radio (pseudolite) transceiver/laser detector (R/P_T&L_D) 80, a wireless link 60, and a display 90, as depicted in FIG. 2.

In one embodiment of the present invention, the step (A) (step 14 of FIG. 1) further comprises receiving the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter} by using the stationary self-positioning radio transceiver 54 of FIG. 2.

The Global Positioning System (GPS) is a system of satellite signal transmitters that transmits information from which an observer's present location and/or the time of observation can be determined. The GPS system is fully described in the document ICD-GPS-200: GPS Interface Control Document, ARINC Research, 1997, GPS Joint Program Office, which is incorporated by reference herein.

Another satellite-based navigation system is called the Global Orbiting Navigational System (GLONASS), which can operate as an alternative or supplemental system. The GLONASS system was placed in orbit by the former Soviet Union and now maintained by the Russian Republic.

As disclosed in the European Commission "White Paper on European transport policy for 2010", the European Union will develop an independent satellite navigation system GALILEO as a part of a global navigation satellite infrastructure (GNSS).

Reference to a radio positioning system herein refers to a Global Positioning System (GPS), to a Global Orbiting Navigation System (GLONASS), to GALILEO System, and to any other compatible Global Navigational Satellite System (GNSS) satellite-based system that provides information by which an observer's position and the time of observation can be determined, all of which meet the requirements of the present invention.

In one embodiment of the present invention, the radio transceiver 54 of FIG. 2 further comprises a pseudolite transceiver 54 configured to receive the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}. Preferably, the pseudolite transceiver 54 is configured to receive the first plurality of external radio signals broadcasted by at least four radio sources selected from the group consisting of: {GPS; GLONASS; combined GPS/GLONASS; GALILEO; Global Navigational Satellite System (GNSS); and a pseudolite transmitter}.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands. Pseudolites can be used for enhancing the GPS by providing increased accuracy, integrity, and availability.

The complete description of the pseudolite transmitters in GPS band can be found in "Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif, and by Utilicom, Santa Barbara, Calif.

Pseudolites as radio positioning systems can be configured to operate in ISM band.

The stationary self-positioning radio (pseudolite) transceiver 54 (of FIG. 2) is configured to receive the first plurality of external radio signals, and is configured to determine its position coordinates based on the first plurality of received external radio signals. In one embodiment of the present invention, the step 16 (of FIG. 1) of broadcasting at least one internal radio signal via the wireless link 60 is performed by using the stationary self-positioning radio (pseudolite) transceiver 54 (of FIG. 2). The broadcasted internal radio signal includes the position coordinates of the stationary self-positioning radio (pseudolite) transceiver 54 (of FIG. 2).

Referring still to FIG. 2, in one embodiment of the present invention, the wireless communication link 60 can be implemented by using a variety of different embodiments.

In general, the wireless communication link 60 (of FIG. 2) can be implemented by using a radiowave frequency band, an infrared frequency band, or a microwave frequency band. In one embodiment, the wireless communication link can include the ISM band, including 900 MHZ, 2.4 GHz, or 5.8 GHz bands, wherein the user can own both ends of the ISM communication system.

In one embodiment of the present invention, the wireless communication link 60 (of FIG. 2) can be implemented by using the Trimble SiteNet™ 900 private radio network. The Trimble SiteNet™ 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902-928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision™ GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the wireless communication link 60 (of FIG. 2) can be implemented by using a 1.8 GHz band that supports the personal communications services (PCS). The PCS uses the international standard DCS-1800.

In one more embodiment, the wireless communication link 60 can include a real time circuit switched wireless communication link. For instance, the first wireless communication link employing a real time circuit switched wireless communication link can include the Iridium satellite system produced by Motorola, Schaumburg, Ill.

In one additional embodiment, the wireless communication link 60 can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20-30) GHz range are manufactured by Cellular Communications located in Redmond, Wash., and the LEOS systems in (1.6-2.5) GHz range are produced by Loral/Qualcomm located in San Diego, Calif.

The wireless communication link 60 can also include a cellular telephone communication means, a paging signal receiving means, wireless messaging services, wireless application services, a wireless WAN/LAN station, or an Earth-satellite-Earth communication module that uses at least one satellite to relay a radiowave signal. The wireless communication link 60 can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radio link using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

In one embodiment of the present invention, the laser transmitter 50 of FIG. 2 further comprises a plane laser transmitter configured to generate a reference laser beam 72 (or 74) providing a high accuracy vertical coordinate. Similar plane laser transmitter is fully disclosed in the U.S. Pat. No. 6,433,866 "High precision GPS/RTK and laser machine control" assigned to the assignee of the present invention. The U.S. Pat. No. 6,433,866 is incorporated herein in its entirety.

More specifically, according to the '866 patent, the laser transmitter 50 includes a rotating laser system. In a rotating laser system a laser source spins (mechanically, or optically) in the horizontal plane (or Z-plane). The rotating laser emits a laser beam that provides an accurate reference plane with a millimeter accuracy. However, to detect and get benefit of the rotating laser beam, the potential user has to be located within vertical range, and has to be equipped with a laser detector (or a laser receiver) capable of receiving the rotating laser beam. In the mechanical embodiment, the motor physically rotates the laser and accordingly the laser beam. In the optical embodiment, the mirror rotates in such a way that the physically non-rotating laser emits the rotating laser beam. In one embodiment of the present invention, the step (C) (step 18 of FIG. 1) further comprises generating a reference laser beam providing a high accuracy vertical coordinate by using the plane laser transmitter 50 of FIG. 2.

In one embodiment of the present invention, the step (C) (step 18 of FIG. 1) further comprises generating at least one rotating fan-shaped laser beam 72 (and/or 74) by using the fan laser transmitter 50 of FIG. 2.

Trimble Navigation Ltd. manufactures 3D Laser Station that generates at least one rotating fan-shaped laser beam 72 (or 74). The detailed description of such fan laser transmitter 50 is given in the copending published U.S. patent application US-2006-0012777 entitled "COMBINATION LASER SYSTEM AND GLOBAL NAVIGATION SATELLITE SYSTEM" that is incorporated by reference herein in its entirety. The copending U.S. patent application US-2006-0012777 is assigned to the assignee of the present patent application.

Referring still to FIG. 1, in one embodiment of the present invention, the step (E) (22 of FIG. 1) is performed by using the mobile unit 80 of FIG. 2 comprising the integrated radio (pseudolite) transceiver/laser detector (R/P_T&L_D) further comprising a first radio (pseudolite) positioning system transceiver 66, a second radio (pseudolite) positioning system transceiver 68, and a laser detector 70 integrated with the radio positioning system transceivers 66 and 68.

In one embodiment of the present invention, each mobile unit 80 is equipped with a laser detector 70 comprising a number of diodes. A laser receiver measures the signal strength on a number of diodes to determine the center of a laser beam. Topcon, Laser Systems, Inc., located in Pleasanton, Calif., manufactures machine mounted laser receivers: 9130 laser tracker and LS-B2 laser receiver. For reference, please see the '866 US patent.

In one embodiment of the present invention, the first radio (pseudolite) positioning system transceiver 66 is configured to receive the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

Preferably, in one embodiment of the present invention, the first radio (pseudolite) positioning system transceiver 66 is configured to receive the second plurality of external radio signals broadcasted by at least four radio sources selected from the group consisting of: {GPS; GLONASS; combined GPS/GLONASS; GALILEO; Global Navigational Satellite System (GNSS); and a pseudolite transmitter}.

In one embodiment of the present invention, the stationary radio (pseudolite) transceiver 54 and the first mobile radio (pseudolite) transceiver 66 are selected to include the same GPS receiver configured to receive the satellite signals from the four GPS satellite-vehicles SV#1 42, SV#2 44, SV#3 46, and SV#4 48.

Referring still to FIG. 1, in one embodiment of the present invention, the step (F) (22 of FIG. 1) is performed by using the mobile unit 80 of FIG. 2 comprising the integrated radio (pseudolite) transceiver/laser detector (R/P_T&L_D) further comprising the first radio (pseudolite) positioning system transceiver 66, the second radio (pseudolite) positioning system transceiver 68, and the laser detector 70 integrated with the radio positioning system transceivers 66 and 68.

In one embodiment of the present invention, the first radio (pseudolite) positioning system transceiver 66 is configured to determine its 3-D position coordinates based on the second plurality of received external radio signals by using its navigational processor (not shown). In this embodiment of the present invention, at least one mobile integrated radio (pseudolite) transceiver/laser detector (R/P_T&L_D) 80 is configured to determine its 3-D position coordinates at the first level of accuracy (at the meter or at the centimeter level) based on the second plurality of received external radio signals, and is configured to determine its elevation at the second level of accuracy (at the millimeter level) based on at least one detected laser beam 72 (and/or 74) by using its navigation processor (not shown).

In another embodiment of the present invention, the first radio (pseudolite) transceiver 66 is configured to receive the second plurality of external radio signals, the second radio (pseudolite) pseudolite transceiver 68 is configured to receive at least one internal radio signal broadcasted by the transceiver 54 by using the wireless link 60, and the laser detector 70 is configured to detect at least one laser beam 72 (and/or 74) generated by the stationary laser transmitter 50. In this embodiment of the present invention, at least one mobile integrated radio (pseudolite) transceiver/laser detector (R/P_T&L_D) 80 is configured to determine its 3-D position coordinates at the first (centimeter or meter) level of accuracy based on at least one internal radio signal broadcasted by the stationary radio transceiver 54 and based on the second plurality of received external radio signals broadcasted by the satellites SV#1 42, SV#2 44, SV#3 46, and SV#4 48, or broadcasted by some other external radio-sources (not shown), and is configured to determine its elevation at the second (millimeter) level of accuracy based on at least one detected laser beam 72 (and/or 74).

Referring still to FIG. 2, in one embodiment of the present invention, at least one mobile integrated radio (pseudolite) transceiver/laser detector (R/P_T&L_D) 80 further comprises the weighting/navigational processor 76 configured to assign different weights to different sets of measurement data based on a measurement algorithm. In one embodiment of the present invention, the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

EXAMPLE

The measurement algorithm takes into account a plurality of measurement site parameters selected from the group consisting of: {topology of the site; whether conditions at the site; and visibility of at least one laser beam at the site}. (A) If topology of the site is such that there is no clear view of the sky, the set of measurements based on the external satellite radio signals has a low priority and is assigned the lowest weighting factor. (B) If whether conditions at the site are such that the visibility of at least one laser beam at the site is good, the set of measurements based on the detected laser data should be assigned the highest weighting factor. (C) If whether conditions at the site are such that the visibility of at least one laser beam at the site is bad, the set of measurements based on the detected laser data should be assigned the lowest weighting factor.

Referring still to FIG. 1, in one embodiment, the method of the present invention further comprises the step G (step 26) of broadcasting the 3-D position coordinates of the mobile unit 80 (of FIG. 2) by using the first radio (pseudolite) transceiver 66 (or by using the second radio (pseudolite) transceiver 68) via the wireless link 60.

In one embodiment, the method of the present invention further comprises the step (H) (not shown) of receiving the 3-D position coordinates of at least one mobile unit 80 by using the self-positioning radio (pseudolite) transceiver 54 via the wireless link 60.

In one embodiment of the present invention, the self-positioning radio (pseudolite) transceiver 54 further comprises the display unit 90. In this embodiment of the present invention, the step (H) further comprises (not shown) the step of displaying location of at least one mobile unit 80 on the display block 90.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of tracking at least one mobile unit utilizing a radio and light based 3-D positioning system; said radio and light based 3-D positioning system comprising a stationary self-positioning radio (pseudolite) transceiver, a stationary laser transmitter positioned in a location with known coordinates, at least one mobile integrated radio (pseudolite) transceiver/laser detector (R/P_T&L_D), a wireless link, and a display block; said method comprising:
    (A) determining position coordinates of said stationary self-positioning radio (pseudolite) transceiver based on a first plurality of external radio signals by using said stationary self-positioning radio (pseudolite) transceiver;
    (B) broadcasting at least one internal radio signal by using said self-positioning radio (pseudolite) transceiver by using said wireless link; wherein said at least one internal radio signal includes position coordinates of said self-positioning radio (pseudolite) transceiver;
    (C) generating at least one laser beam by using said stationary laser transmitter;
    (D) broadcasting said at least one laser beam generated by said stationary laser transmitter;
    (E) receiving a second plurality of external radio signals, receiving at least one said internal radio signal via said wireless link, and detecting said at least one laser beam by using said integrated radio (pseudolite) transceiver/laser detector (R/P_T&L_D);
    (F) determining 3-D position coordinates of said at least one mobile unit comprising said integrated radio (pseudolite) transceiver/laser detector (R/P_T&L_D) based on a set of data selected from the group consisting of: said second plurality of received external radio signals; said at least one received internal radio signal; and said at least one detected laser beam; and
    (G) broadcasting said 3-D position coordinates of said at least one mobile unit by using said integrated radio (pseudolite) transceiver/laser detector (R/P_T&L_D) via said wireless link.

2. The method of claim 1, wherein said step (A) further comprises:
    (A1) receiving said first plurality of external radio signals broadcasted by at least one radio source selected from the group consisting of: GPS; GLONASS; combined GPS/GLONASS; GALILEO; Global Navigational Satellite System (GNSS); and a pseudolite transmitter by said stationary self-positioning radio (pseudolite) transceiver.

3. The method of claim 1, wherein said step (C) further comprises:
    (C1) generating a reference laser beam providing a high accuracy vertical coordinate by using a plane laser transmitter.

4. The method of claim 1, wherein said step (C) further comprises:
    (C2) generating at least one rotating fan-shaped laser beam by using a fan laser transmitter.

5. The method of claim 1, wherein said step (E) further comprises:
    (E1) receiving said second plurality of external radio signals broadcasted by at least one radio source selected from the group consisting of: GPS; GLONASS; combined GPS/GLONASS; GALILEO; Global Navigational Satellite System (GNSS); and a pseudolite transmitter by said at least one mobile unit comprising said integrated radio (pseudolite) transceiver/laser detector (R/P_T&L_D).

6. The method of claim 1, wherein said step (F) further comprises:
    (F1) determining 3-D position coordinates of said mobile unit comprising said integrated radio (pseudolite) transceiver/laser detector (R/P_T&L_D) at the first level of accuracy based on said second plurality of received external radio signals; and
    (F2) determining an elevation coordinate of said mobile unit comprising said integrated radio (pseudolite) transceiver/laser detector (R/P_T&L_D) at the second level of accuracy based on said at least one detected laser beam; wherein a set of measurements determined at said second level of accuracy is more accurate than said set of measurements determined at said first level of accuracy.

7. The method of claim 1, wherein said step (F) further comprises:
    (F3) determining 3-D position coordinates of said mobile unit comprising said integrated radio (pseudolite) transceiver/laser detector (R/P_T&L_D) at the first level of accuracy based on said second plurality of received external radio signals and based on said at least one received internal radio signal; and
    (F4) determining an elevation coordinate of said mobile unit comprising said integrated radio (pseudolite) transceiver/laser detector (R/P_T&L_D) at the second level of accuracy based on said at least one detected laser beam; wherein a set of measurements determined at said second level of accuracy is more accurate than said set of measurements determined at said first level of accuracy.

8. The method of claim 1, wherein said step (F) further comprises:
    (F5) assigning different weights to different sets of measurement data based on a measurement algorithm by using a weighting processor; wherein said measurement algorithm is optimized to take into account at least one measurement site parameter at the time of measurement; and wherein each said measurement site parameter is selected from the group consisting of: topology of said site; weather conditions at said site; and visibility of at least one said laser beam at said site.

9. The method of claim 1, wherein said integrated radio (pseudolite) Transceiver/laser detector (R/P_T&L_D) further comprises a first radio (pseudolite) transceiver and a second radio (pseudolite) transceiver, wherein said step (G) further comprises:
 (G1) broadcasting said 3-D position coordinates of said mobile unit by using said first radio (pseudolite) transceiver via said wireless link.

10. The method of claim 1, wherein said integrated radio (pseudolite) transceiver/laser detector (R/P_T&L_D) further comprises a first radio (pseudolite) transceiver and a second radio (pseudolite) transceiver, wherein said step (G) further comprises:
 (G2) broadcasting said 3-D position coordinates of said mobile unit by using said second radio (pseudolite) transceiver via said wireless link.

11. The method of claim 1 further comprising:
 (H) receiving said 3-D position coordinates of said at least one mobile unit by said self-positioning radio (pseudolite) transceiver.

12. The method of claim 11, wherein said stationary self-positioning radio (pseudolite) transceiver further comprises a display block, said step (H) further comprising:
 (H1) displaying location of said at least one mobile unit on said display block.

13. A method of tracking at least one mobile unit utilizing a radio and light based 3-D positioning system; said radio and light based 3-D positioning system comprising a stationary self-positioning radio (pseudolite) transceiver, a stationary laser transmitter positioned in a location with known coordinates, at least one mobile integrated radio (pseudolite) transceiver/laser detector (R/P_T&L_D), a wireless link, and a display block; said method comprising:
 (A) determining position coordinates of said stationary self-positioning radio (pseudolite) transceiver based on a first plurality of external radio signals by using said stationary self-positioning radio (pseudolite) transceiver;
 (B) broadcasting at least one internal radio signal by using said self-positioning radio (pseudolite) transceiver via said wireless link;
 (C) generating at least one laser beam by using said stationary laser transmitter;
 (D) broadcasting said at least one laser beam generated by said stationary laser transmitter;
 and
 (E) receiving 3-D position coordinates of said at least one mobile unit broadcasted by said integrated radio (pseudolite) transceiver/laser detector (R/P_T&L_D) by said stationary self-positioning radio (pseudolite) transceiver via said wireless link.

14. The method of claim 13 further comprising:
 (F) displaying location of said at least one mobile unit on said display block.

15. A method of reporting by at least one mobile unit utilizing a radio and light based 3-D positioning system; said radio and light based 3-D positioning system comprising a stationary self-positioning radio (pseudolite) transceiver, a stationary laser transmitter positioned in a location with known coordinates, at least one mobile integrated radio (pseudolite) transceiver/laser detector (R/P_T&L_D), and a wireless link; said method comprising:
 (A) receiving a second plurality of external radio signals, receiving at least one internal radio signal broadcasted by said stationary self-positioning radio (pseudolite) transceiver via said wireless link, and detecting said at least one laser beam generated by said stationary laser transmitter positioned in said location with known coordinates by using said integrated radio (pseudolite) transceiver/laser detector (R/P_T&L_D);
 (B) determining 3-D position coordinates of said at least one mobile unit comprising said integrated radio (pseudolite) transceiver/laser detector (R/P_T&L_D) based on a set of data selected from the group consisting of: said second plurality of received external radio signals; said at least one received internal radio signal; and said at least one detected laser beam;
 and
 (C) broadcasting said 3-D position coordinates of said at least one mobile unit comprising said integrated radio (pseudolite) transceiver/laser detector (R/P_T&L_D) via said wireless link.

* * * * *